United States Patent
Myers

[19]

[11] Patent Number: 5,831,420
[45] Date of Patent: Nov. 3, 1998

[54] PULSE LOAD AVERAGING POWER CONVERTER

[75] Inventor: Ronald Gene Myers, Scottsdale, Ariz.

[73] Assignee: Motorola, Inc., Schaumburg, Ill.

[21] Appl. No.: 842,101

[22] Filed: Apr. 28, 1997

[51] Int. Cl.[6] .............................. G05F 1/56; H04M 11/00
[52] U.S. Cl. ............................. 323/282; 323/284; 379/58
[58] Field of Search .................................. 323/282, 283, 323/284, 351; 361/18, 87; 379/55, 58, 61; 318/150, 161

[56] References Cited

U.S. PATENT DOCUMENTS

| | | | |
|---|---|---|---|
| 3,621,372 | 11/1971 | Paine et al. ............................... | 323/287 |
| 4,426,611 | 1/1984 | Espelage et al. ......................... | 318/803 |
| 4,642,535 | 2/1987 | Hucker ..................................... | 318/161 |
| 4,653,069 | 3/1987 | Roeder ...................................... | 380/31 |
| 4,769,753 | 9/1988 | Knudson et al. .......................... | 363/60 |
| 5,396,538 | 3/1995 | Hong ......................................... | 379/58 |
| 5,410,601 | 4/1995 | Hashimoto ................................ | 380/14 |

*Primary Examiner*—Adolf Berhane
*Attorney, Agent, or Firm*—Dana B. LeMoine

[57] ABSTRACT

A pulse load averaging power converter (10) provides low duty cycle, high amplitude power pulses while drawing substantially constant power from a power source. A voltage peak detector (70) provides a pulse width modulator PWM (20) with a feedback signal proportional to the peak of the output voltage. A regulated switching power converter (200) utilizes pulse load averaging power converter (10). The resulting power converter provides high current, low duty cycle power pulses, while maintaining a substantially constant current draw on a battery (230). An individual subscriber unit (400) which operates in a cellular communications system, utilizes pulse load averaging power converter (10) to prolong battery life.

16 Claims, 3 Drawing Sheets

PULSE LOAD AVERAGING POWER CONVERTER

FIELD OF THE INVENTION

This invention relates in general to switching power supplies, and in particular, to switching power supplies that draw a substantially constant current from a power source.

BACKGROUND OF THE INVENTION

Portable communications systems, which are often powered by batteries, require efficient power supplies. For example, handheld Individual Subscriber Units (ISU) for use in a satellite based cellular communications system operate for extended periods of time from a battery and therefore require efficient power supplies. During operation, it is desirable for these ISUs to transmit low duty ratio, high amplitude power pulses. As a result, the power supply within the ISU draws large amounts of current for very short periods of time from the ISU's battery.

These high discharge rates are detrimental to batteries. As batteries are subjected to high discharge rates over time, battery capacity and battery voltage decrease. As a result, the ISU batteries have lower operating time and reduced life, both very undesirable for portable communications equipment. Because the high amplitude power pulses are of a low duty cycle, the average power provided by the battery is much lower than the peak power demanded during any one power pulse.

To increase battery operating time and extend battery life, it is desirable to have the battery supply a substantially constant current that represents the average power demand rather than to supply a peak current during the low duty cycle power pulses. This is termed "Pulse Load Averaging".

Pulse load averaging has been conventionally achieved with passive filtering. Passive filtering presents a problem when the frequency of the power pulses is low and the size of the passive filter components is large. As handheld devices become smaller, the limitation on the size of passive components becomes more pronounced, thereby causing passive filtering to become an undesirable solution to the problem.

Accordingly, there is a great need for a small and efficient power converter which can supply peak power as demanded by an individual subscriber unit, while constantly drawing the average power from a battery.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Generally, the present invention helps solve the problem of providing pulsed power while drawing substantially constant power from a power source. In accordance with a first embodiment of the present invention, the apparatus includes a pulse width modulator and a voltage peak detector which feeds a peak detected voltage from the output port of the apparatus back to a control input of the pulse width modulator. An inductive energy storage device is coupled to an input port of the apparatus.

In accordance with another embodiment of the present invention, the apparatus includes a pulse load averaging power converter coupled to a switching power converter with a shunt capacitor at the coupling point. The pulse load averaging power converter draws a substantially constant current from a power source while the switching power converter provides good load regulation.

In accordance with another embodiment of the present invention, a method of producing an output voltage across an output charge storage device while drawing a substantially constant current from a power source is provided. The current is drawn through an inductive storage element, measured, and diverted by a switch to charge the output storage device. The output voltage is peak detected and the resulting peak detected output voltage along with the current measurement causes the duty cycle of the switching element to change.

Figure 1:
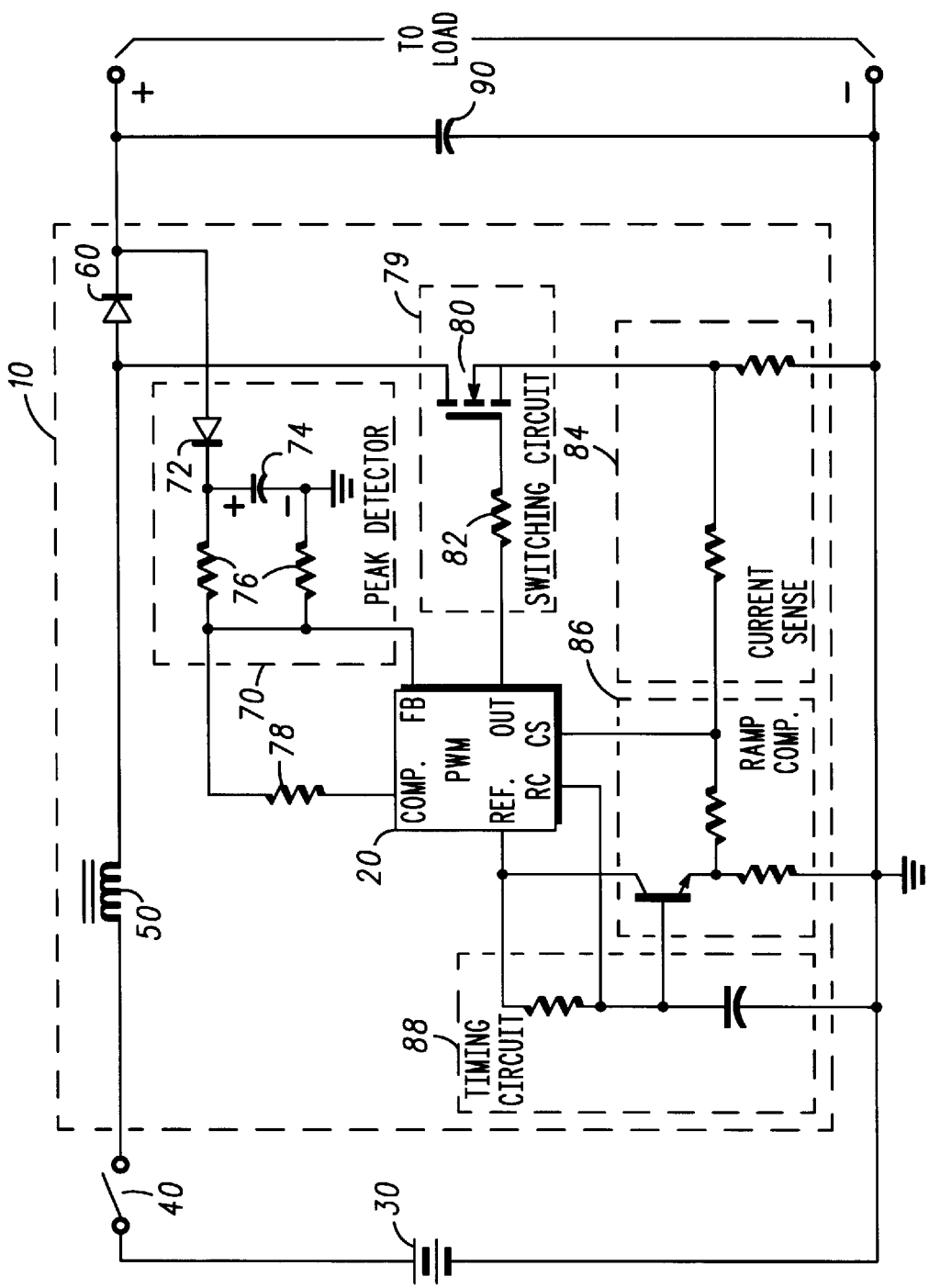
FIG. 1 shows a schematic diagram of a pulse load averaging power converter in accordance with a preferred embodiment of the present invention.

FIG. 1 shows a schematic diagram of a pulse load averaging power converter 10, connected to a battery 30 and a switch 40 on the input, and to a capacitor 90 on the output. Pulse load averaging power converter 10 includes a pulse width modulator (PWM) 20, a peak detector 70, a switching circuit 79, a current sense circuit 84, a timing circuit 88, a ramp compensation circuit 86, an inductor 50, a diode 60, and a resistor 78.

It is to be understood that many of the specific details of any particular exemplary embodiment are disclosed herein to satisfy the best mode requirement and do not in any way limit the scope of the invention.

PWM 20 is common in the art and many varied embodiments are available in integrated circuit form. An exemplary PWM for this application is a Unitrode UCC3805. PWM 20 has as control inputs:

RC: which when connected to an RC combination, determines the frequency of an internal oscillator;

CS: which is an input to current sense comparators;

FB: which is the inverting input of an error amplifier; and

COMP: which sets the gain of an internal operational amplifier.

PWM 20 has as control outputs:

REF: which is an internal reference voltage; and

OUT: which provides a pulse width modulated control signal.

Switching circuit 79 of FIG. 1 acts as a single pole single throw switch which is controlled by PWM 20. In the preferred embodiment being set forth, switching circuit 79 includes a resistor 82 and a MOSFET 80, however one with ordinary skill in the art will appreciate that other possible circuit topologies that provide the switching function could be substituted therefor while still practicing the present invention. An exemplary MOSFET for this application is a MTD20N03HDL manufactured by Motorola. Other devices capable of performing as a switch, such as a bipolar transistor, may be substituted for the MOSFET. Resistor 82 is used to couple the PWM output to the MOSFET.

Voltage peak detector 70 includes a diode 72, a capacitor 74, and a voltage divider 76. Diode 72 has an anode connected to the output of pulse load averaging power converter 10, and a cathode connected to capacitor 74. Voltage peak detector 70 detects the peak voltage on the output and feeds it back to the PWM 20. The peak detector as shown in FIG. 1 is an exemplary embodiment, and one skilled in the art will appreciate that other methods of peak detection could be substituted therefor while still practicing the present invention. The voltage divider 76 is included to scale the voltage that is fed back to PWM 20 and is shown as part of an exemplary embodiment. It should be noted that the voltage divider 76 is not a necessary part of peak detector 70 and is omitted in an alternate embodiment of the present invention.

Timing circuit 88 includes an RC combination that sets the frequency of an oscillator internal to PWM 20. The internal oscillator dictates the switching frequency of the switching circuit. The switching frequency is higher than the frequency of the load pulses, and in a preferred embodiment, the switching frequency is about 300 kHz.

Inductor 50 is utilized as an inductive energy storage device to help keep the current being drawn from battery 30 substantially constant. Other types of inductive energy storage devices, such as a transformer winding, could be substituted for inductor 50 and accomplish the same result.

Current sense circuit 84 functions to measure the current flowing through the switching circuit and to provide current measurement information to PWM 20. There are many ways to implement current sense circuits that will function in a manner compatible with the preferred embodiment as shown. In an alternate embodiment, current sense circuit 84 includes an op-amp with one input coupled to the MOSFET 80 in order to decrease circuit loading.

Ramp compensation circuit 86 includes resistors and a transistor which is preferably a 2N2222. Ramp compensation circuits are known to those with ordinary skill in the art. The purpose of these circuits is to prevent instability and enhance performance in the presence of circuit noise.

During operation, PWM 20 drives switching circuit 79 and causes it to alternate between a conducting state and a non-conducting state. Within switching circuit 79, MOSFET 80, when conducting, conducts current from the drain to the source and to the current sense circuit 84. The output of current sense circuit 84 drives the current sense input of PWM 20 as previously discussed.

After MOSFET 80 has conducted current for a period of time, inductor 50 contains energy. The amount of energy stored in inductor 50 is a function of the length of time that MOSFET 80 previously conducted current. As PWM 20 pulse width modulated output causes MOSFET 80 to transition from the conducting state to the non-conducting state, current which was conducting through MOSFET 80 is diverted through diode 60, and causes charge to be stored on capacitor 90, thereby increasing the voltage. As the MOSFET is repeatedly switched, charge is repeatedly pumped through diode 60 causing the output voltage to increase.

The pulse load averaging power converter is capable of producing a voltage on its output significantly greater than the voltage on its input because of the operation of inductor 50 and the switching of MOSFET 80. The voltage difference from output to input is a function of, among other things, the duty cycle of the pulse width modulated output of PWM 20.

The duty cycle of the pulse width modulated output of PWM 20 is, in turn, controlled by the FB input of PWM 20 and the current sense input of PWM 20. The FB input of PWM 20 is driven by voltage peak detector 70. Voltage peak detector 70 functions to detect the peak voltage as present on the output of pulse load averaging power converter 10. This is in contrast to conventional boost power converter design which generally uses a feedback signal which is proportional to the output voltage.

Because the feedback signal as directed to PWM 20 is essentially constant, and proportional to the peak detected output voltage, the pulse width modulated output of PWM 20 has a substantially constant duty cycle. The substantially constant switching duty cycle of MOSFET 80 provides for a substantially constant amount of energy stored in inductor 50, which in turn, provides for a substantially constant current in inductor 50. This, in turn, provides for a substantially constant current in battery 30 and thereby provides all the advantages previously mentioned.

In the preferred embodiment, the frequency of the PWM output remains relatively constant while the amount of time that the switching circuit remains on each period is adjusted to modify the duty cycle. In an alternate embodiment, the amount of time that the switching circuit remains on is relatively constant and the frequency is adjusted. In yet another embodiment, both the amount of time that the switching circuit remains on and the frequency are adjusted to modify the duty cycle. One with ordinary skill in the art will appreciate that the ratio of the amount of time the switching circuit is on to the period of the PWM output defines the duty cycle and that there are multiple methods to change the value of the ratio. All of those methods are intended to be within the scope of the present invention.

As shown in FIG. 1, the preferred embodiment of pulse load averaging power converter 10 has a battery as a power source, but one with ordinary skill in the art will appreciate that the power source can be any conventional means of supplying power and is not strictly limited to a battery that is co-located with the pulse load averaging power converter 10. For example, a DC voltage may be produced from a transformed and rectified AC signal, or alternatively, a DC voltage may be injected directly from an external DC source such as an automotive battery.

As shown in FIG. 1, the preferred embodiment of pulse load averaging power converter 10 has a capacitor as a charge storage device on the output. One with ordinary skill in the art will appreciate that the capacitor functions as a device that stores charge and that any other device that is capable of storing charge would be equivalent for the purposes of the present invention.

Figure 2:
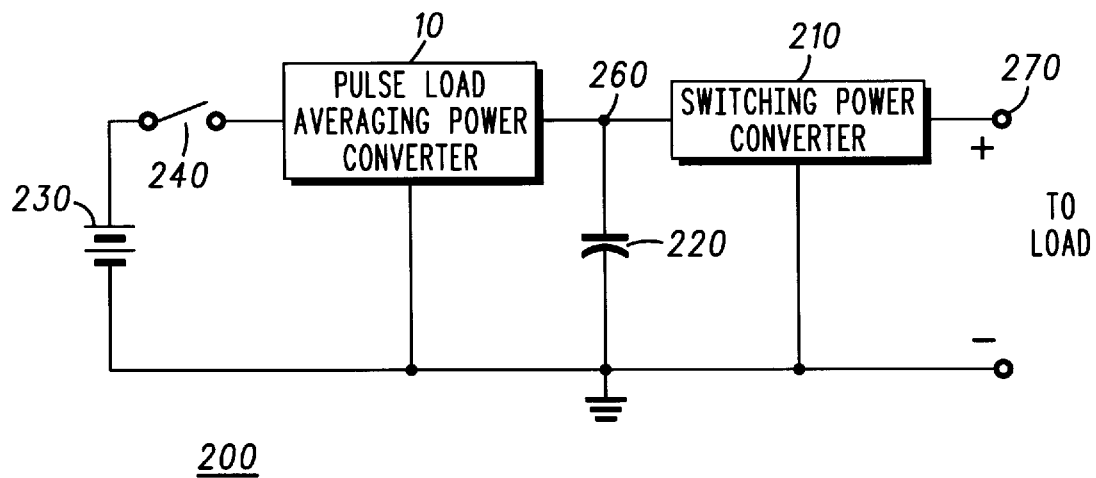
FIG. 2 shows a diagram of a power converter which includes a pulse load averaging power converter in accordance with a preferred embodiment of the present invention.

FIG. 2 shows a diagram of a power converter 200 which includes pulse load averaging power converter 10 as a constituent part. Power converter 200 has a power source, here shown as battery 230, and a switch 240 for connecting the battery 230 to the remainder of power converter 200. The output of pulse load averaging power converter 10 is connected to a charge storage device shown as a capacitor 220 at node 260. Node 260 is then the input to a switching power converter 210 provided for additional regulation of the final output voltage which exists at node 270. Switching power converter 210 is preferably a buck converter, but can be one of many different types. It should be noted that capacitor 220 functions to store charge between the pulse load averaging power converter 10 and the switching power converter 210. Other devices capable of storing charge are interchangeable with capacitor 220 while still practicing the present invention.

FIGS. 3, 4, 5, and 6 show examples of current and voltage waveforms as measured at various nodes of power converter 200 during operation. One use of power converter 200 is in an individual subscriber unit operating in a satellite based cellular communication system where low duty ratio, high amplitude power pulses are desirable. In this case, the duty cycle is ten percent, and the period is 100 milliseconds. Power converter 200 supplies peak power for 10 milliseconds and then substantially zero power for 90 milliseconds, and then the cycle repeats.

Figure 3:
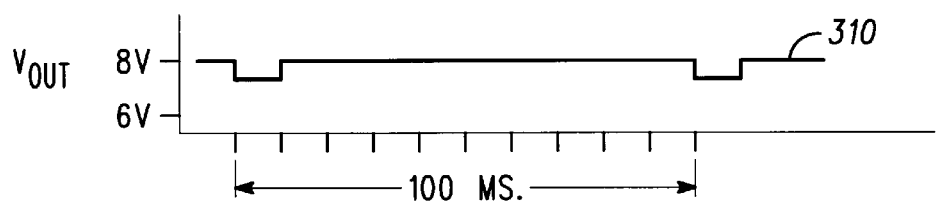
FIG. 3 shows an example of a voltage waveform that represents the output voltage of the power converter shown in FIG. 2.

As shown in FIG. 3, the exemplary output voltage waveform 310 is well regulated and substantially constant at 8 volts. This exemplary output voltage waveform 310 represents the voltage at node 270 (FIG. 2).

Figure 4:
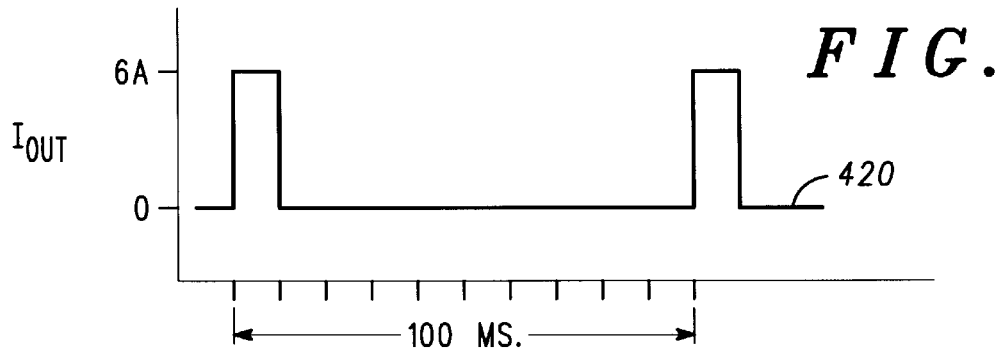
FIG. 4 shows an example of a current waveform that represents the current supplied by the power converter shown in FIG. 2.

As shown in FIG. 4, the exemplary output current waveform 420 shows the low duty cycle, high current demands placed on power converter 200 (FIG. 2). The current draw in this configuration is 6 amps at a ten percent duty cycle, and represents the current at node 270 (FIG. 2).

Figure 5:
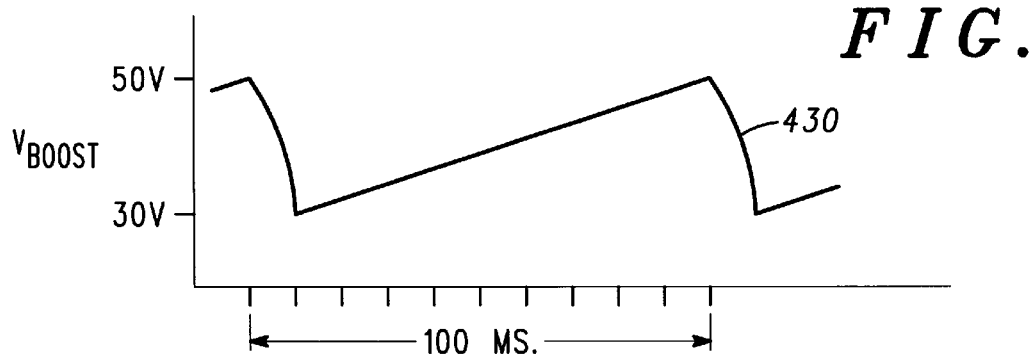
FIG. 5 shows an example of a voltage waveform that represents the voltage at the output of the pulse load averaging power converter shown in FIG. 2.

As shown in FIG. 5, the exemplary boost voltage waveform 430 represents the voltage at node 260 (FIG. 2). In the preferred embodiment as exemplified by FIG. 5, the boost voltage maintains a 20 volt ripple while output voltage remains well regulated during periods of high output current. During the 10 millisecond high current draw on the output, the boost voltage drops by 20 volts. Then, during the next 90 milliseconds, the boost voltage, which is a measure of the quantity of charge on charge storage device 220, increases in a substantially linear manner to the peak boost voltage.

Figure 6:
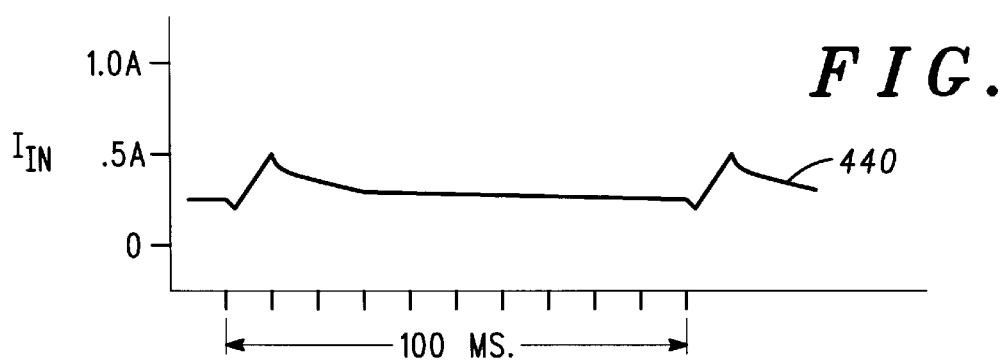
FIG. 6 shows an example of a current waveform that represents the input current to the pulse load averaging power converter shown in FIG. 2.

As shown in FIG. 6, the exemplary input current waveform 440 represents the current drawn into pulse load averaging power converter from battery 230. It can be seen that the pulse load averaging power converter has transformed the high power low duty cycle demands of the system into a substantially constant current draw on battery 230. Input current waveform 340 shows that a substantially constant current is drawn from battery 230 when practicing the present invention. All waveforms as shown in FIGS. 3, 4, 5, and 6 were produced with an input voltage of 12 volts as measured at battery 230.

Figure 7:
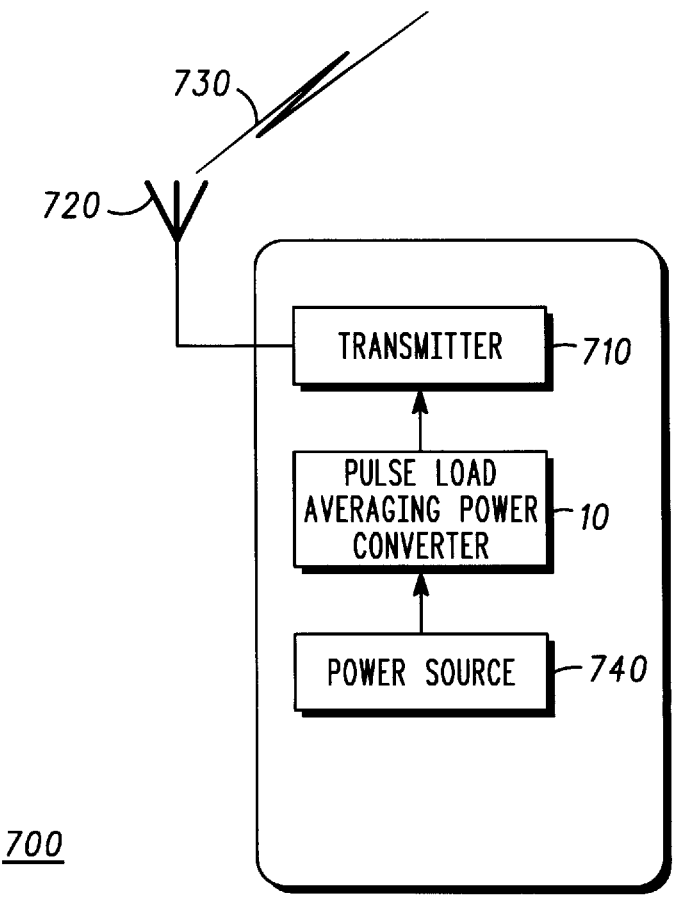
FIG. 7 shows a diagram of an individual subscriber unit which includes a pulse load averaging power converter in accordance with a preferred embodiment of the present invention.

FIG. 7 shows a diagram of an individual subscriber unit incorporating pulse load averaging power converter 10. Individual subscriber unit 700 has a transmitter 710 connected to an antenna 720 which transmits signals 730 at high power with a low duty cycle. Because the pulse load averaging power converter 10 is included in individual subscriber unit 700, the life of power source 740 is greatly increased.

The individual subscriber unit 700 is not limited to use in a satellite based cellular communications system. The individual subscriber unit 700 of FIG. 7 represents one of many possible mobile communications applications where a pulse load averaging power converter can be advantageously utilized, such as business radios, amateur radios, or the like.

A pulse load averaging power converter has been described which provides for a substantially constant current draw from a power source when providing high power, low duty cycle pulses as an output. The substantially constant current is desirable because the loss of battery capacity over time is reduced and the overall battery life is extended.

The present invention, in many of its attendant advantages will be understood from the foregoing description and it will be apparent that various changes may be made in the form, construction, and the arrangement of the parts, without departing from the spirit and scope of the invention, or sacrificing all of their material advantages, the form herein being merely a preferred or exemplary embodiment thereof.

Accordingly, it is intended that the appended claims cover all modifications of the invention which fall within the true spirit and scope of the invention.

What is claimed is:

1. A pulse load averaging power converter for providing an output voltage on an output port comprising:

a pulse width modulator having at least one control input and at least one control output, said at least one control output being coupled to said output port; and a voltage peak detector coupled between said output port and at least one of said at least one control input of said pulse width modulator, thereby providing a feedback path for a peak-detected voltage such that a duty cycle of said pulse width modulator is modified responsive to the peak-detected voltage.

2. The pulse load averaging power converter of claim 1 wherein said voltage peak detector comprises:

a diode having an anode coupled to said output port, and a cathode; and a charge storage device coupled to said cathode.

3. A pulse load averaging power converter for providing an output voltage on an output port comprising:

1) a pulse width modulator having at least one control input and at east one control output, said at least one control output being coupled to said output port; and 2) a voltage peak detector coupled between said output port and at least one of said at least one control input of said pulse width modulator, wherein said voltage peak detector comprises:

2a) a diode having an anode coupled to said output port, and a cathode;

2b) a charge storage device coupled to said cathode; and 2c) a voltage divider coupled between said cathode and at least one of said at least one control input of said pulse width modulator.

4. A pulse load averaging power converter for providing an output voltage on an output port comprising:

a pulse width modulator having at least one control input and at least one control output, said at least one control output being coupled to said output port;

a voltage peak detector coupled between said output port and at least one of said at least one control input of said pulse width modulator;

an input port for connection to a power source;

an inductive energy storage device having a current passing therethrough, a first terminal coupled to said input port, and a second terminal; and a diode having an anode coupled to the second terminal of said inductive energy storage device, and a cathode coupled to said output port.

5. The pulse load averaging power converter of claim 4 further comprising current sensing means for measuring the current in said inductive energy storage device, said current sensing means being coupled to at least one of said at least one control input of said pulse width modulator.

6. The pulse load averaging power converter of claim 5 further comprising switching means, responsive to at least one of said at least one control output of said pulse width modulator, for diverting the current in said inductive energy storage device from said diode to said current sensing means.

7. A power converter which draws a substantially constant current from a power source, said power converter comprising:
   1) a pulse load averaging power converter having an output port, wherein said pulse load averaging power converter comprises:
      1a) a pulse width modulator having at least one control input and at least one control output, said at least one control output being coupled to said output port of said pulse load averaging power converter; and
      1b) a voltage peak detector coupled between the output port and at least one of said at least one control input of said pulse width modulator;
   2) a switching power converter having an input port coupled to the output port of said pulse load averaging power converter; and
   3) a charge storage device coupled to the output port of said pulse load averaging power converter.

8. The power converter of claim 7 wherein said voltage peak detector comprises:
   a diode having an anode coupled to said output port, and a cathode; and
   a charge storage device coupled to said cathode.

9. The power converter of claim 8 wherein said voltage peak detector further comprises a voltage divider coupled between said cathode and at least one of said at least one control input of said pulse width modulator.

10. The power converter of claim 7 wherein said pulse load averaging power converter further comprises:
    an input port for connection to a power source;
    an inductive energy storage device having a current passing therethrough, a first terminal connected to said input port, and a second terminal; and
    a diode having an anode coupled to the second terminal of said inductive energy storage device, and a cathode coupled to said output port of said pulse load averaging power converter.

11. The power converter of claim 10 wherein said pulse load averaging power converter further comprises current sensing means for measuring the current in said inductive energy storage device, said current sensing means being coupled to at least one of said at least one control input of said pulse width modulator.

12. The power converter of claim 11 wherein said pulse load averaging power converter further comprises switching means, responsive to at least one of said at least one control output of said pulse width modulator, for diverting the current in said inductive energy storage device from said diode to said current sensing means.

13. A subscriber unit comprising:
    1) a transmitter; and
    2) a pulse load averaging power converter for supplying power to said transmitter, wherein said pulse load averaging power converter comprises:
       2a) means for drawing a substantially constant current from a power source into an input port, wherein the means for drawing a substantially constant current from a power source comprises:
          2a1) means for detecting a peak voltage on said output port;
          2a2) an inductive energy storage device coupled to said input port; and
          2a3) pulse width modulator control means, responsive to said peak voltage, for maintaining said substantially constant current in said inductive energy storage device; and
       2b) means for periodically recharging a charge storage device coupled to an output port to a substantially constant voltage value.

14. A subscriber unit comprising:
    1) a transmitter; and
    2) a pulse load averaging power converter for supplying power to said transmitter, wherein said pulse load averaging power converter comprises:
       2a) means for drawing a substantially constant current from a power source into an input port; and
       2b) means for periodically recharging a charge storage device coupled to an output port to a substantially constant voltage value, wherein the means for periodically recharging a charge storage device comprises:
          2b1) means for detecting a peak voltage on said output port;
          2b2) a diode coupled to said output port; and
          2b3) pulse width modulator control means, responsive to said peak voltage, for pumping charge through said diode.

15. A method of producing an output voltage across an output charge storage device while drawing a substantially constant current from a power source comprising the steps of:
    peak detecting said output voltage to produce a peak detected output voltage;
    providing a pulse width modulated signal having a duty cycle to a switching circuit, wherein said switching circuit causes said current to be diverted to said output charge storage device thereby producing said output voltage; and
    modifying said duty cycle based on said peak detected output voltage.

16. The method of claim 15 further comprising the steps of:
    drawing said current through an inductive energy storage element;
    measuring said current to produce a current measurement; and
    further modifying said duty cycle based on said current measurement.

* * * * *